US009851970B2

(12) United States Patent
Kunzman et al.

(10) Patent No.: US 9,851,970 B2
(45) Date of Patent: Dec. 26, 2017

(54) METHOD AND APPARATUS FOR PERFORMING REDUCTION OPERATIONS ON A SET OF VECTOR ELEMENTS

(71) Applicant: INTEL CORPORATION, Santa Clara, CA (US)

(72) Inventors: David M. Kunzman, San Jose, CA (US); Christopher J. Hughes, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 347 days.

(21) Appl. No.: 14/581,478

(22) Filed: Dec. 23, 2014

(65) Prior Publication Data

US 2016/0179537 A1    Jun. 23, 2016

(51) Int. Cl.
*G06F 15/76* (2006.01)
*G06F 9/302* (2006.01)
(Continued)

(52) U.S. Cl.
CPC ........ *G06F 9/30036* (2013.01); *G06F 9/3001* (2013.01); *G06F 9/30018* (2013.01);
(Continued)

(58) Field of Classification Search
CPC .............. G06F 9/30036; G06F 9/3001; G06F 9/30018; G06F 9/30021; G06F 9/3834;
(Continued)

(56) References Cited

U.S. PATENT DOCUMENTS 5,845,112 A * 12/1998 Nguyen ................. G06T 9/005
708/402
7,991,987 B2 * 8/2011 Cabot ....................... G06F 7/02
340/146.2
(Continued)

FOREIGN PATENT DOCUMENTS

CN    104204989 A    12/2014

OTHER PUBLICATIONS

Transmittal of the International Search Report and the Written Opinion of the International Searching Authority from Patent Cooperation Treaty Application No. PCT/US2015/062074, dated Apr. 22, 2016, 9 pages.
International Preliminary Report on Patentability for Application No. PCT/US2015/062074, dated Jul. 6, 2017, 6 pages.
Taiwan Office Action and Search Report for foreign counterpart Taiwan Application No. 105142765, dated Aug. 11, 2017, 12 pages.

*Primary Examiner* — Daniel Pan
(74) *Attorney, Agent, or Firm* — Nicholson De Vos Webster & Elliott LLP

(57) ABSTRACT

An apparatus and method are described for performing SIMD reduction operations. For example, one embodiment of a processor comprises: a value vector register containing a plurality of data element values to be reduced; an index vector register to store a plurality of index values indicating which values in the value vector register are associated with one another; single instruction multiple data (SIMD) reduction logic to perform reduction operations on the data element values within the value vector register by combining data element values from the value vector register which are associated with one another as indicated by the index values in the index vector register; and an accumulation vector register to store results of the reduction operations generated by the SIMD reduction logic.

22 Claims, 18 Drawing Sheets

(51) Int. Cl.
*G06F 9/305* (2006.01)
*G06F 9/315* (2006.01)
*G06F 9/355* (2006.01)
*G06F 9/30* (2006.01)
*G06F 15/80* (2006.01)
*G06F 9/38* (2006.01)

(52) U.S. Cl.
CPC ........ *G06F 9/30021* (2013.01); *G06F 9/3834* (2013.01); *G06F 9/30029* (2013.01); *G06F 9/3887* (2013.01); *G06F 15/8007* (2013.01); *G06F 15/8053* (2013.01)

(58) Field of Classification Search
CPC ............... G06F 9/30029; G06F 9/3887; G06F 15/8007; G06F 15/8053
USPC ...................................... 712/7, 221–224, 22
See application file for complete search history.

(56) References Cited

U.S. PATENT DOCUMENTS

| | | | |
|---|---|---|---|
| 8,447,962 B2 * | 5/2013 | Hughes | G06F 9/30018 |
| | | | 712/244 |
| 9,372,692 B2 | 6/2016 | Hughes et al. | |
| 9,411,584 B2 | 8/2016 | Hughes et al. | |
| 9,411,592 B2 | 8/2016 | Valentine et al. | |
| 2005/0125631 A1 * | 6/2005 | Symes | G06F 9/30145 |
| | | | 712/22 |
| 2009/0276606 A1 | 11/2009 | Mimar | |
| 2011/0302394 A1 | 12/2011 | Russell et al. | |
| 2013/0311530 A1 | 11/2013 | Lee et al. | |
| 2014/0095842 A1 | 4/2014 | Caprioli et al. | |
| 2014/0189288 A1 | 7/2014 | Hartono et al. | |

* cited by examiner

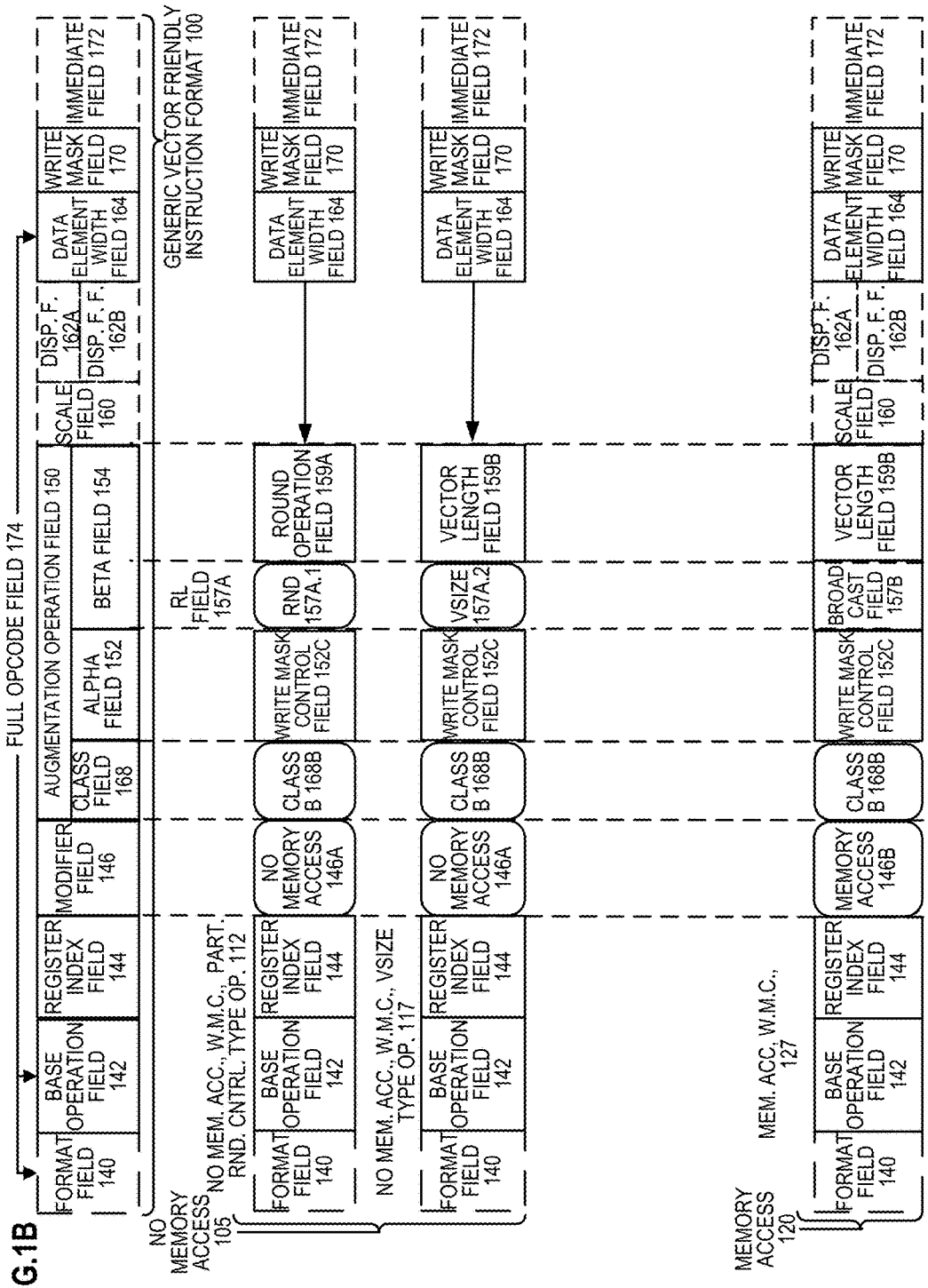

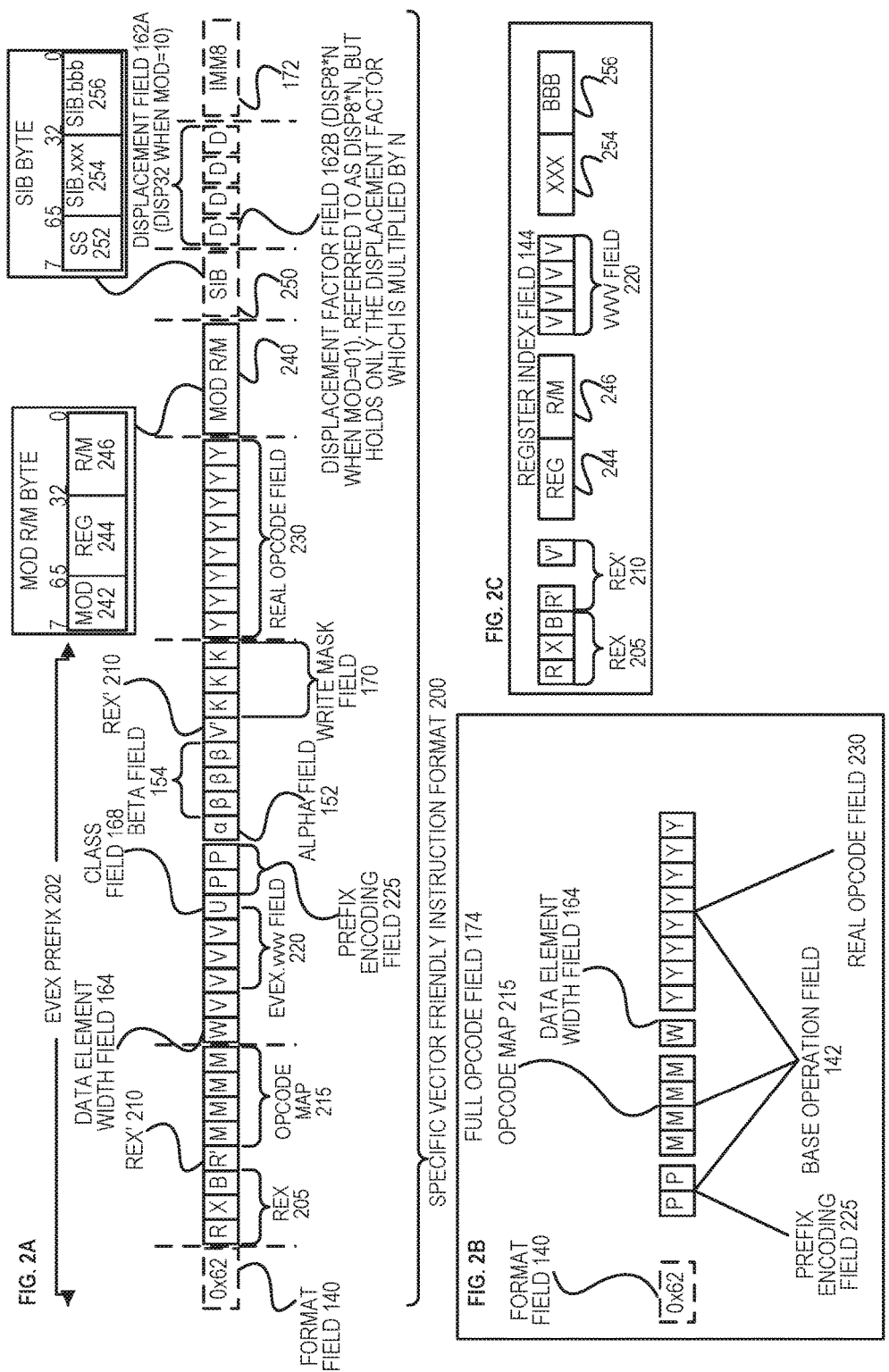

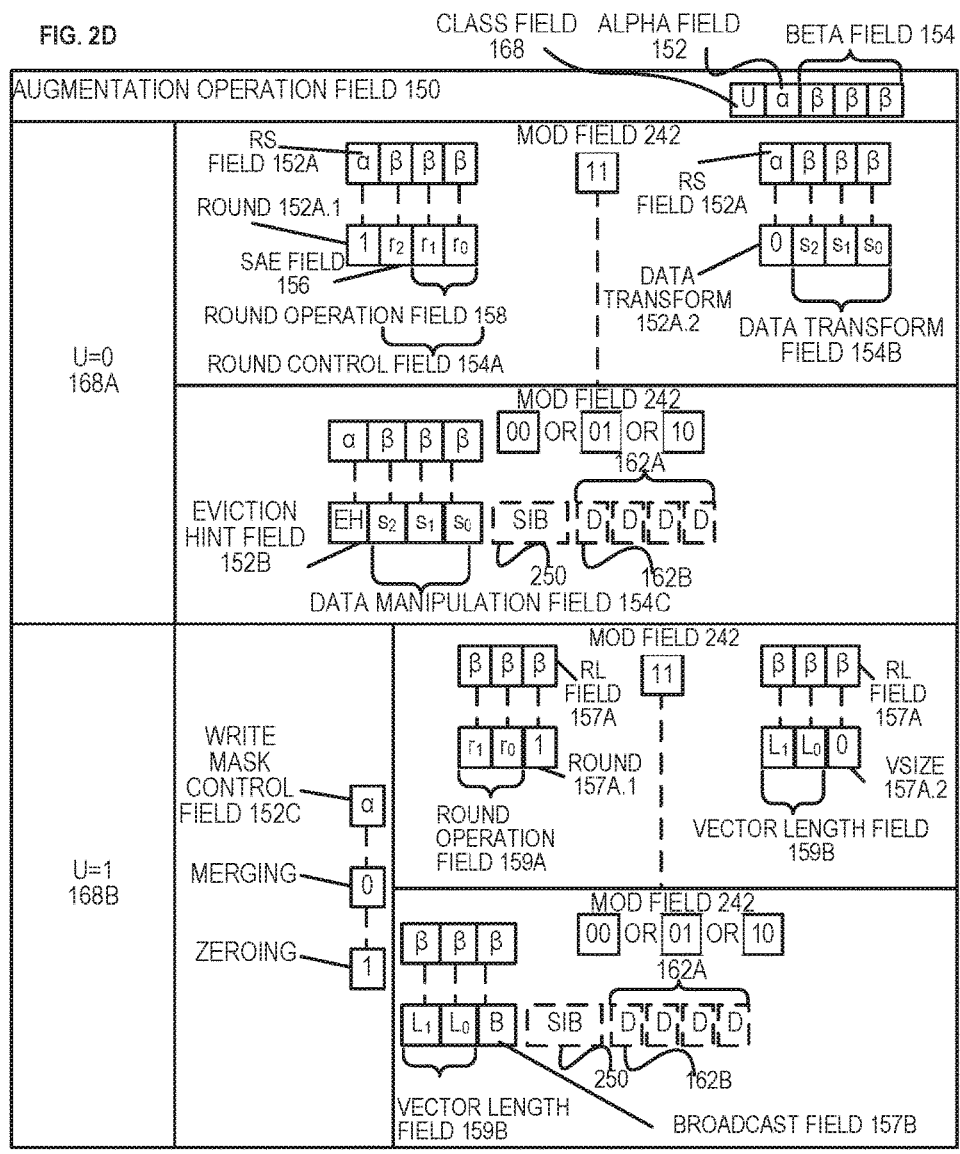

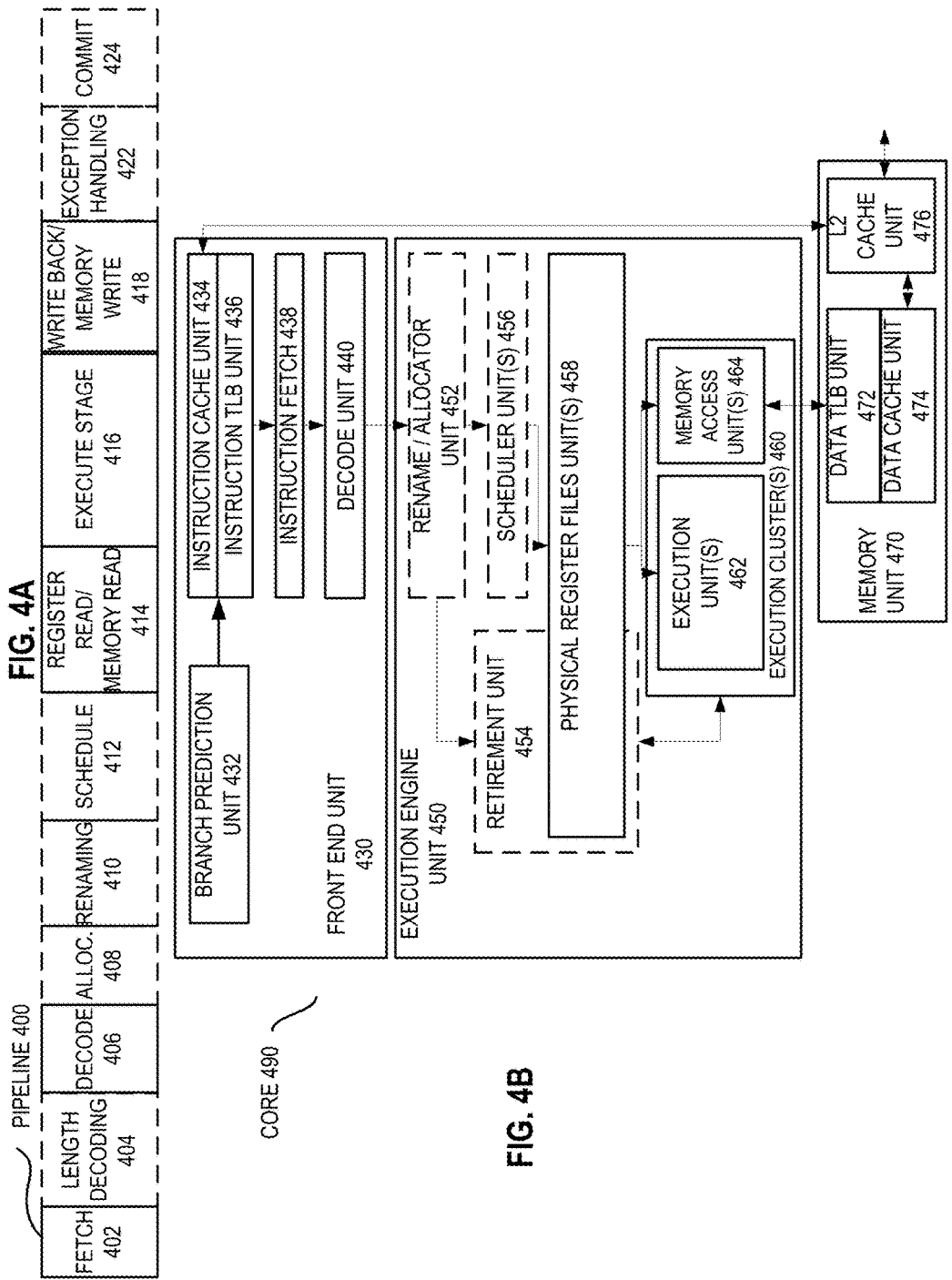

METHOD AND APPARATUS FOR PERFORMING REDUCTION OPERATIONS ON A SET OF VECTOR ELEMENTS

BACKGROUND

Field of the Invention

This invention relates generally to the field of computer processors. More particularly, the invention relates to a method and apparatus for performing reduction operations on a set of vector elements.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. A given instruction is expressed using a given instruction format (and, if defined, in a given one of the instruction templates of that instruction format) and specifies the operation and the operands. An instruction stream is a specific sequence of instructions, where each instruction in the sequence is an occurrence of an instruction in an instruction format (and, if defined, a given one of the instruction templates of that instruction format).

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIG. 2A-D is a block diagram illustrating an exemplary specific vector friendly instruction format according to embodiments of the invention;

FIG. 4A is a block diagram illustrating both an exemplary in-order fetch, decode, retire pipeline and an exemplary register renaming, out-of-order issue/execution pipeline according to embodiments of the invention;

FIG. 4B is a block diagram illustrating both an exemplary embodiment of an in-order fetch, decode, retire core and an exemplary register renaming, out-of-order issue/execution architecture core to be included in a processor according to embodiments of the invention;

DETAILED DESCRIPTION

Figure 1A:
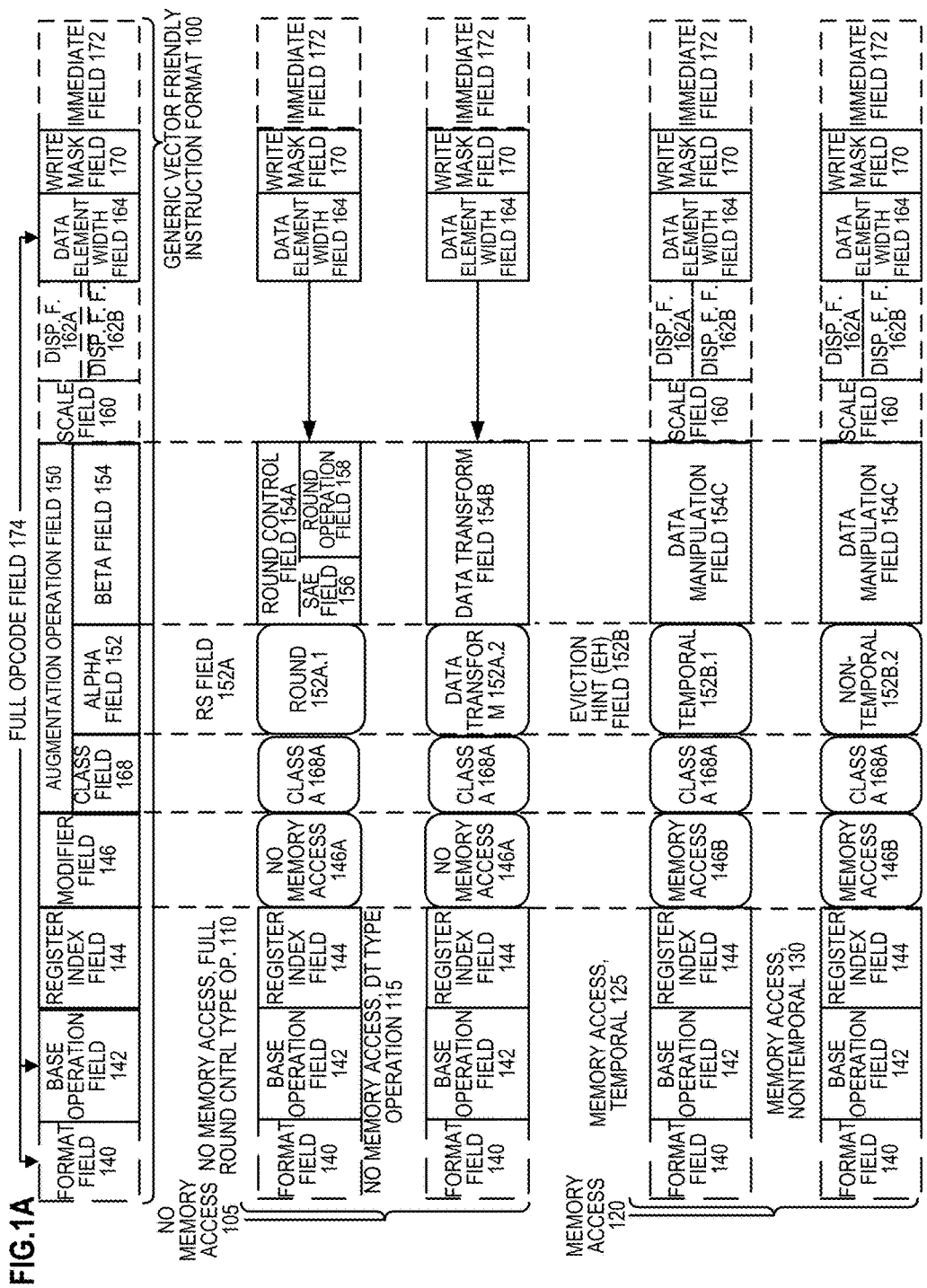

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

A. Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}*index+base$).

Displacement Field 162A—its content is used as part of memory address generation (e.g., for address generation that uses $2^{scale}*index+base+displacement$).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

B. Exemplary Specific Vector Friendly Instruction Format

FIG. 2 is a block diagram illustrating an exemplary specific vector friendly instruction format according to embodiments of the invention. FIG. 2 shows a specific vector friendly instruction format 200 that is specific in the sense that it specifies the location, size, interpretation, and order of the fields, as well as values for some of those fields. The specific vector friendly instruction format 200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 1 into which the fields from FIG. 2 map are illustrated.

It should be understood that, although embodiments of the invention are described with reference to the specific vector friendly instruction format 200 in the context of the generic vector friendly instruction format 100 for illustrative purposes, the invention is not limited to the specific vector friendly instruction format 200 except where claimed. For example, the generic vector friendly instruction format 100 contemplates a variety of possible sizes for the various fields, while the specific vector friendly instruction format 200 is shown as having fields of specific sizes. By way of specific example, while the data element width field 164 is illustrated as a one bit field in the specific vector friendly instruction format 200, the invention is not so limited (that is, the generic vector friendly instruction format 100 contemplates other sizes of the data element width field 164).

The generic vector friendly instruction format 100 includes the following fields listed below in the order illustrated in FIG. 2A.

EVEX Prefix (Bytes 0-3) 202—is encoded in a four-byte form.

Format Field 140 (EVEX Byte 0, bits [7:0])—the first byte (EVEX Byte 0) is the format field 140 and it contains 0x62 (the unique value used for distinguishing the vector friendly instruction format in one embodiment of the invention).

The second-fourth bytes (EVEX Bytes 1-3) include a number of bit fields providing specific capability.

REX field 205 (EVEX Byte 1, bits [7-5])—consists of a EVEX.R bit field (EVEX Byte 1, bit [7]-R), EVEX.X bit field (EVEX byte 1, bit [6]-X), and 157BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 110—this is the first part of the REX' field 110 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 215 (EVEX byte 1, bits [3:0]-mmmm)—its content encodes an implied leading opcode byte (0F, 0F 38, or 0F 3).

Data element width field 164 (EVEX byte 2, bit [7]-W)—is represented by the notation EVEX.W. EVEX.W is used to define the granularity (size) of the datatype (either 32-bit data elements or 64-bit data elements).

EVEX.vvvv 220 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 220 encodes the 4 low-order bits of the first source register specifier stored in inverted (1s complement) form. Depending on the instruction, an extra different EVEX bit field is used to extend the specifier size to 32 registers.

EVEX.U 168 Class field (EVEX byte 2, bit [2]-U)—If EVEX.U=0, it indicates class A or EVEX.U0; if EVEX.U=1, it indicates class B or EVEX.U1.

Prefix encoding field 225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 152 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 154 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 110—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 170 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 230 (Byte 4) is also known as the opcode byte. Part of the opcode is specified in this field.

MOD R/M Field 240 (Byte 5) includes MOD field 242, Reg field 244, and R/M field 246. As previously described, the MOD field's 242 content distinguishes between memory access and non-memory access operations. The role of Reg field 244 can be summarized to two situations: encoding either the destination register operand or a source register operand, or be treated as an opcode extension and not used to encode any instruction operand. The role of R/M field 246 may include the following: encoding the instruction operand that references a memory address, or encoding either the destination register operand or a source register operand.

Scale, Index, Base (SIB) Byte (Byte 6)—As previously described, the scale field's 150 content is used for memory address generation. SIB.xxx 254 and SIB.bbb 256—the contents of these fields have been previously referred to with regard to the register indexes Xxxx and Bbbb.

Displacement field 162A (Bytes 7-10)—when MOD field 242 contains 10, bytes 7-10 are the displacement field 162A, and it works the same as the legacy 32-bit displacement (disp32) and works at byte granularity.

Displacement factor field 162B (Byte 7)—when MOD field 242 contains 01, byte 7 is the displacement factor field 162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 162B is a reinterpretation of disp8; when using displacement factor field 162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 162B substitutes the legacy x86 instruction set 8-bit displacement. Thus, the displacement factor field 162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 172 operates as previously described.

Full Opcode Field

FIG. 2B is a block diagram illustrating the fields of the specific vector friendly instruction format 200 that make up the full opcode field 174 according to one embodiment of the invention. Specifically, the full opcode field 174 includes the format field 140, the base operation field 142, and the data element width (W) field 164. The base operation field 142 includes the prefix encoding field 225, the opcode map field 215, and the real opcode field 230.

Register Index Field

FIG. 2C is a block diagram illustrating the fields of the specific vector friendly instruction format 200 that make up the register index field 144 according to one embodiment of the invention. Specifically, the register index field 144 includes the REX field 205, the REX' field 210, the MODR/M.reg field 244, the MODR/M.r/m field 246, the VVVV field 220, xxx field 254, and the bbb field 256.

Augmentation Operation Field

FIG. 2D is a block diagram illustrating the fields of the specific vector friendly instruction format 200 that make up the augmentation operation field 150 according to one embodiment of the invention. When the class (U) field 168 contains 0, it signifies EVEX.U0 (class A 168A); when it contains 1, it signifies EVEX.U1 (class B 168B). When U=0 and the MOD field 242 contains 11 (signifying a no memory access operation), the alpha field 152 (EVEX byte 3, bit [7]-EH) is interpreted as the rs field 152A. When the rs field 152A contains a 1 (round 152A.1), the beta field 154 (EVEX byte 3, bits [6:4]-SSS) is interpreted as the round control field 154A. The round control field 154A includes a one bit SAE field 156 and a two bit round operation field 158. When the rs field 152A contains a 0 (data transform 152A.2), the beta field 154 (EVEX byte 3, bits [6:4]-SSS) is interpreted as a three bit data transform field 154B. When U=0 and the MOD field 242 contains 00, 01, or 10 (signifying a memory access operation), the alpha field 152 (EVEX byte 3, bit [7]-EH) is interpreted as the eviction hint (EH) field 152B and the beta field 154 (EVEX byte 3, bits [6:4]-SSS) is interpreted as a three bit data manipulation field 154C.

When U=1, the alpha field 152 (EVEX byte 3, bit [7]-EH) is interpreted as the write mask control (Z) field 152C. When U=1 and the MOD field 242 contains 11 (signifying a no memory access operation), part of the beta field 154 (EVEX byte 3, bit [4]-$S_0$) is interpreted as the RL field 157A; when it contains a 1 (round 157A.1) the rest of the beta field 154 (EVEX byte 3, bit [6-5]-$S_{2-1}$) is interpreted as the round operation field 159A, while when the RL field 157A contains a 0 (VSIZE 157.A2) the rest of the beta field 154 (EVEX byte 3, bit [6-5]-$S_{2-1}$) is interpreted as the vector length field 159B (EVEX byte 3, bit [6-5]-$L_{1-0}$). When U=1 and the MOD field 242 contains 00, 01, or 10 (signifying a memory access operation), the beta field 154 (EVEX byte 3, bits [6:4]-SSS) is interpreted as the vector length field 159B (EVEX byte 3, bit [6-5]-$L_{1-0}$) and the broadcast field 157B (EVEX byte 3, bit [4]-B).

C. Exemplary Register Architecture

Figure 3:
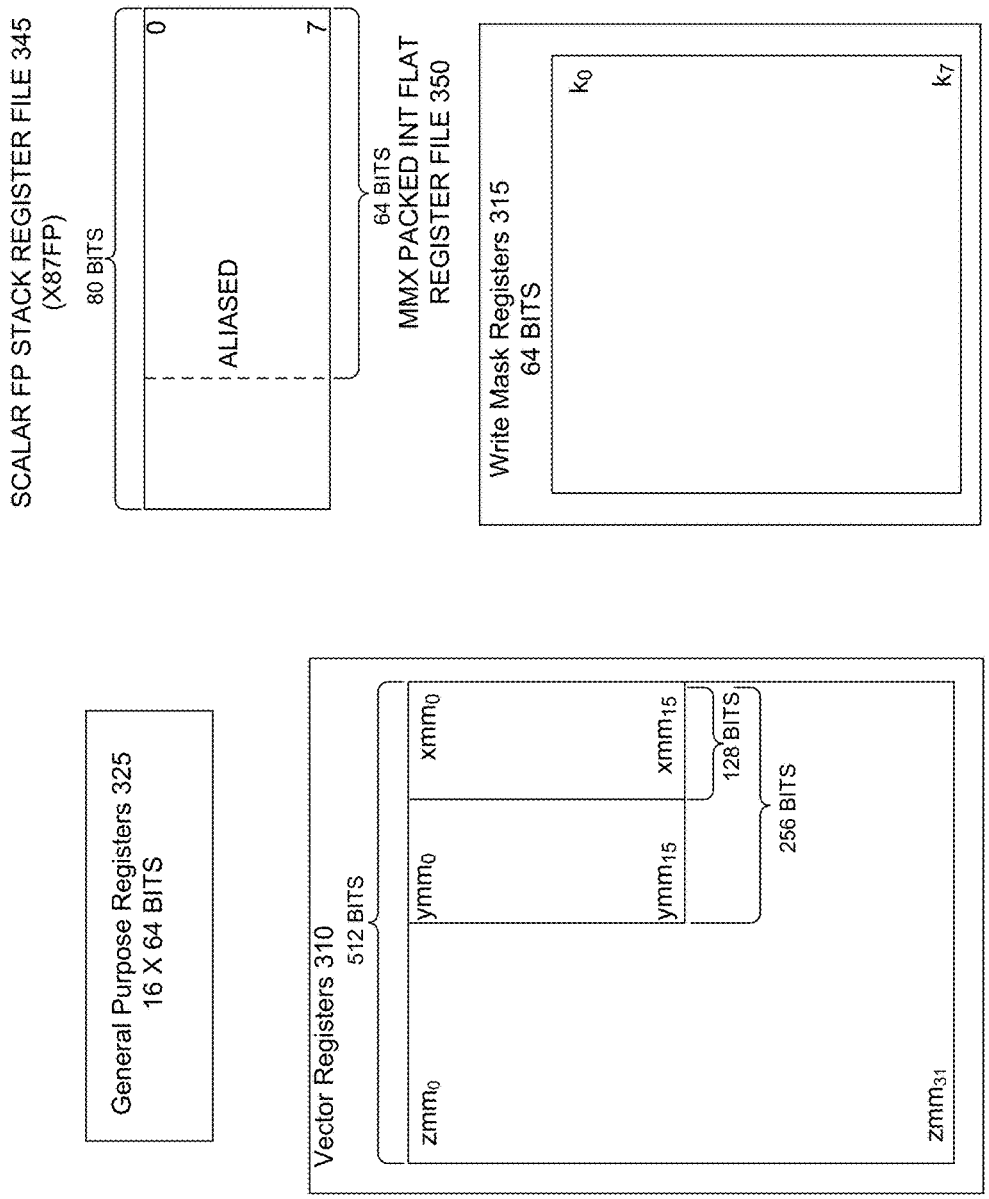
FIG. 3 is a block diagram of a register architecture according to one embodiment of the invention.

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 200 operates on these overlaid register file as illustrated in the below tables.

| Adjustable Vector Length | Class | Operations | Registers |
|---|---|---|---|
| Instruction Templates that do not include the vector length field 159B | A (FIG. 1A; U = 0) | 110, 115, 125, 130 | zmm registers (the vector length is 64 byte) |
| | B (FIG. 1B; U = 1) | 112 | zmm registers (the vector length is 64 byte) |
| Instruction templates that do include the vector length field 159B | B (FIG. 1B; U = 1) | 117, 127 | zmm, ymm, or xmm registers (the vector length is 64 byte, 32 byte, or 16 byte) depending on the vector length field 159B |

In other words, the vector length field 159B selects between a maximum length and one or more other shorter lengths, where each such shorter length is half the length of the preceding length; and instructions templates without the vector length field 159B operate on the maximum vector length. Further, in one embodiment, the class B instruction templates of the specific vector friendly instruction format 200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 315—in the embodiment illustrated, there are 8 write mask registers (k0 through k7), each 64 bits in size. In an alternate embodiment, the write mask registers 315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

D. Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
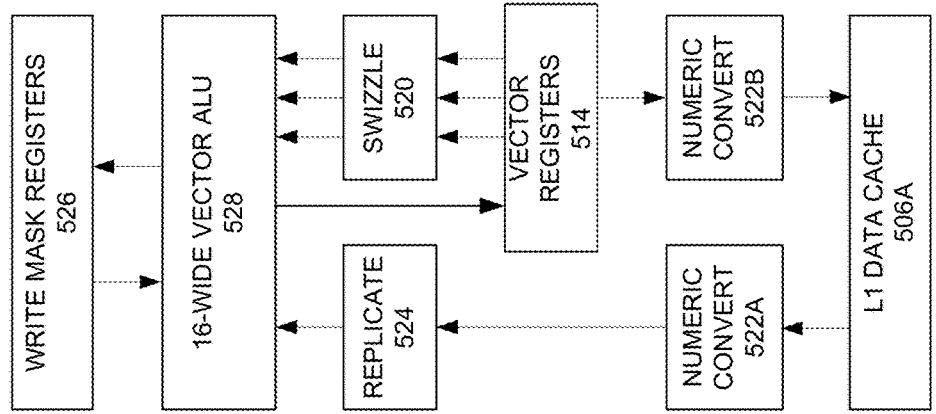
FIG. 5B illustrates an expanded view of part of the processor core in FIG. 5A according to embodiments of the invention.
Figure 5A:
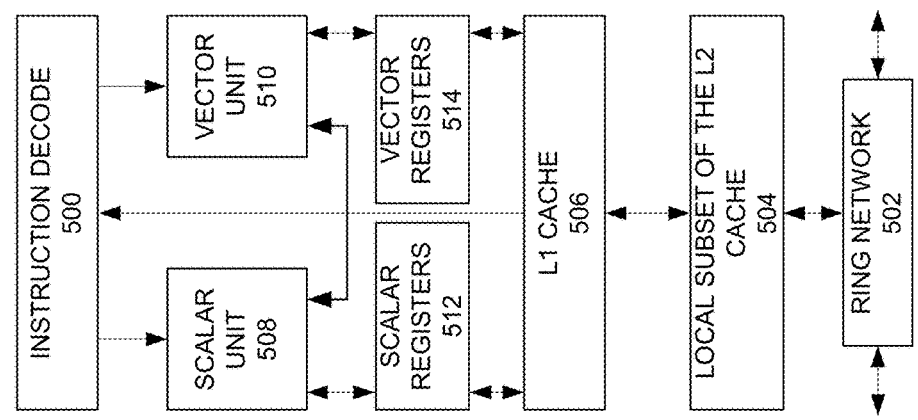
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 16-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input. Write mask registers 526 allow predicating resulting vector writes.

Figure 6:
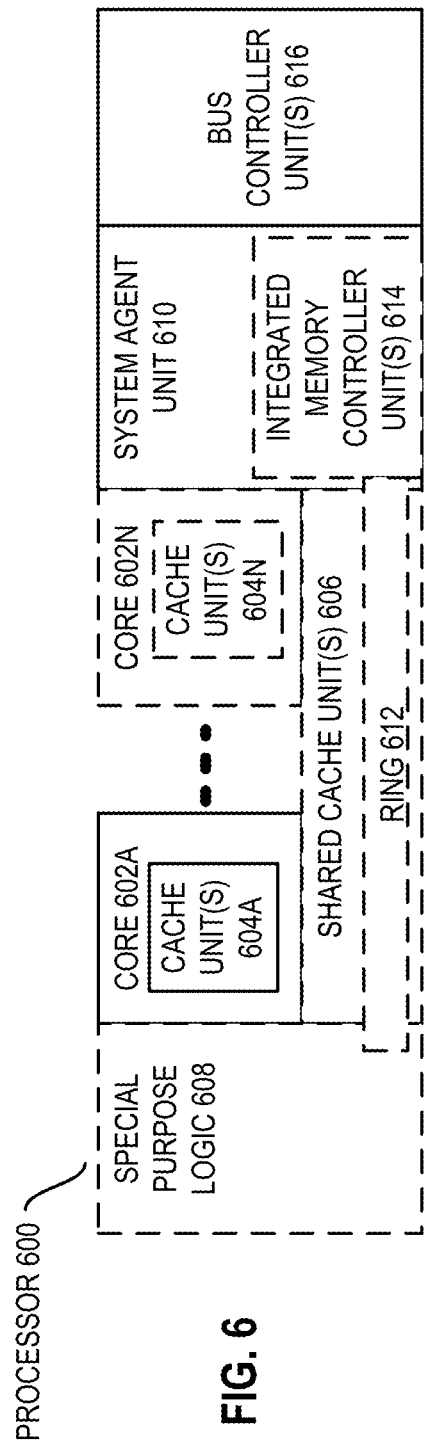
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
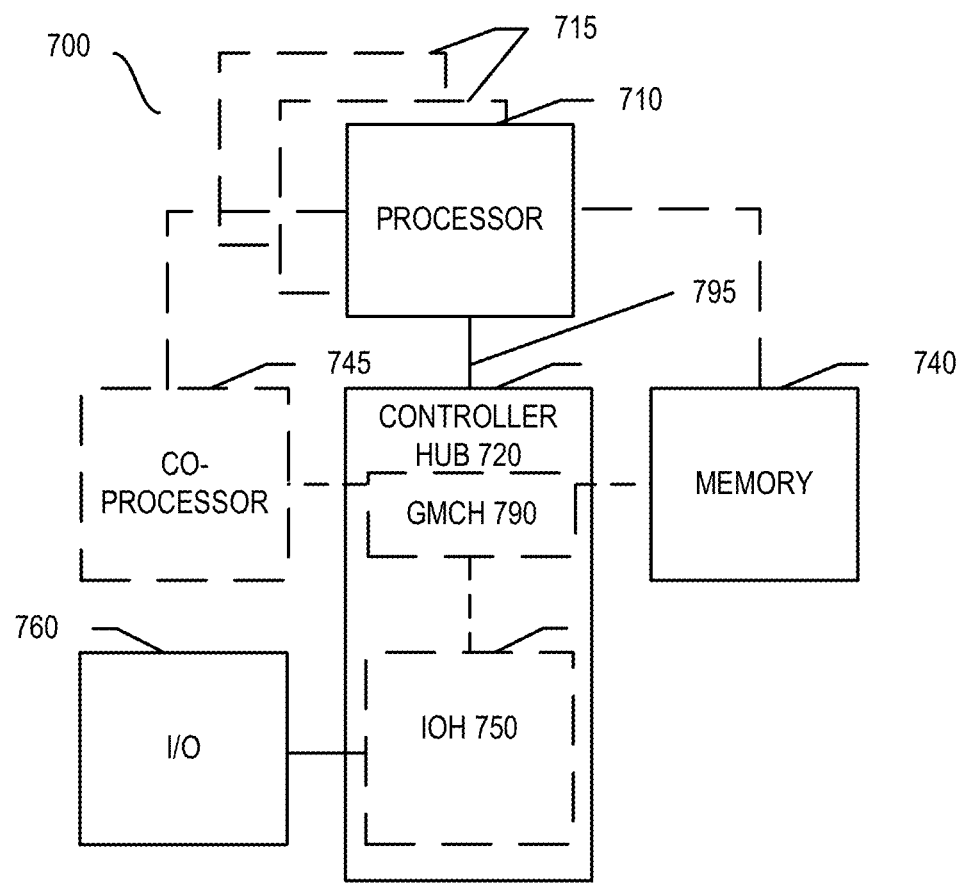
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface such as QuickPath Interconnect (QPI), or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 715 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
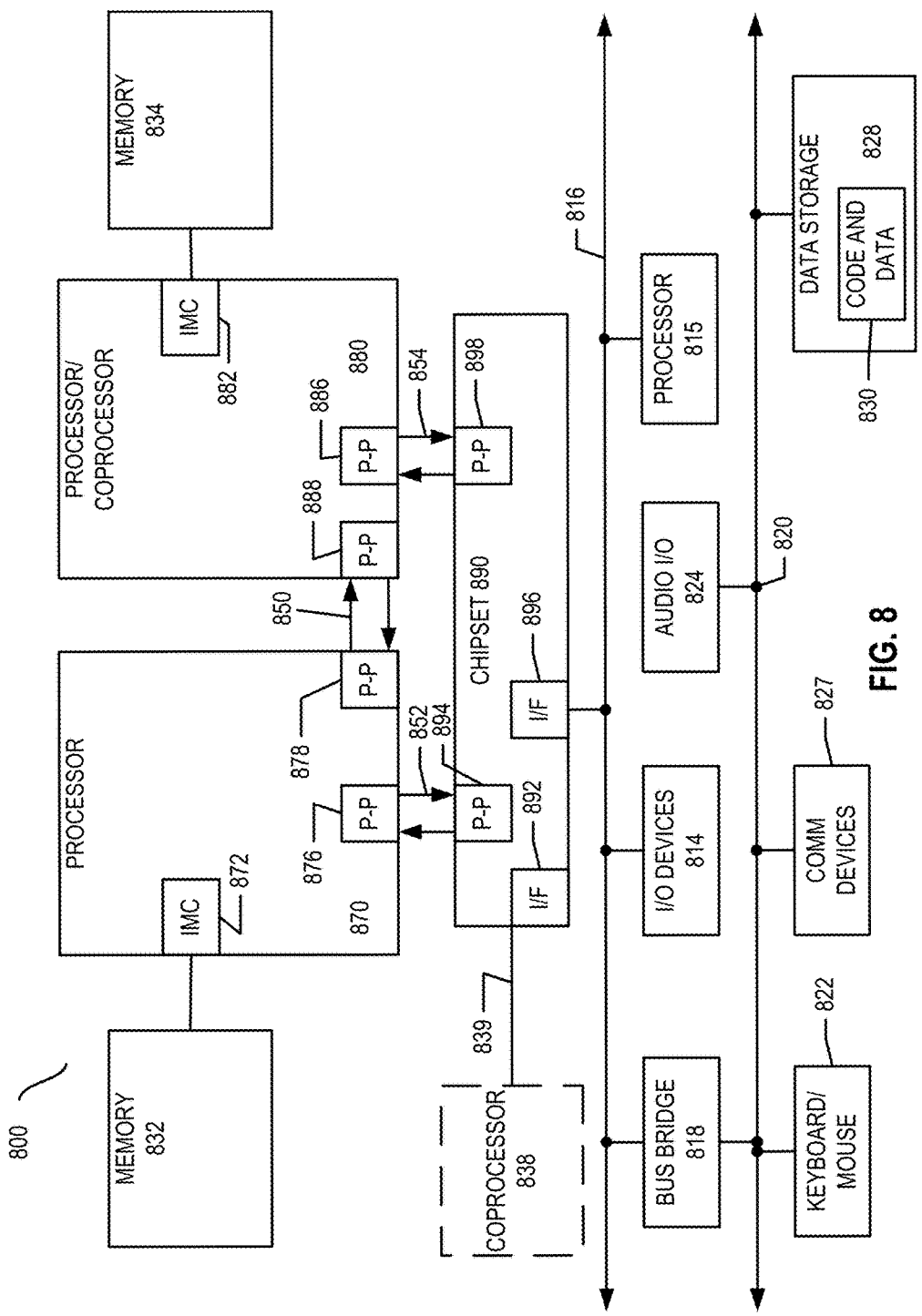
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 839. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 820. Note that other architectures are possible. For example, instead of the point-to-point architecture of FIG. 8, a system may implement a multi-drop bus or other such architecture.

Figure 9:
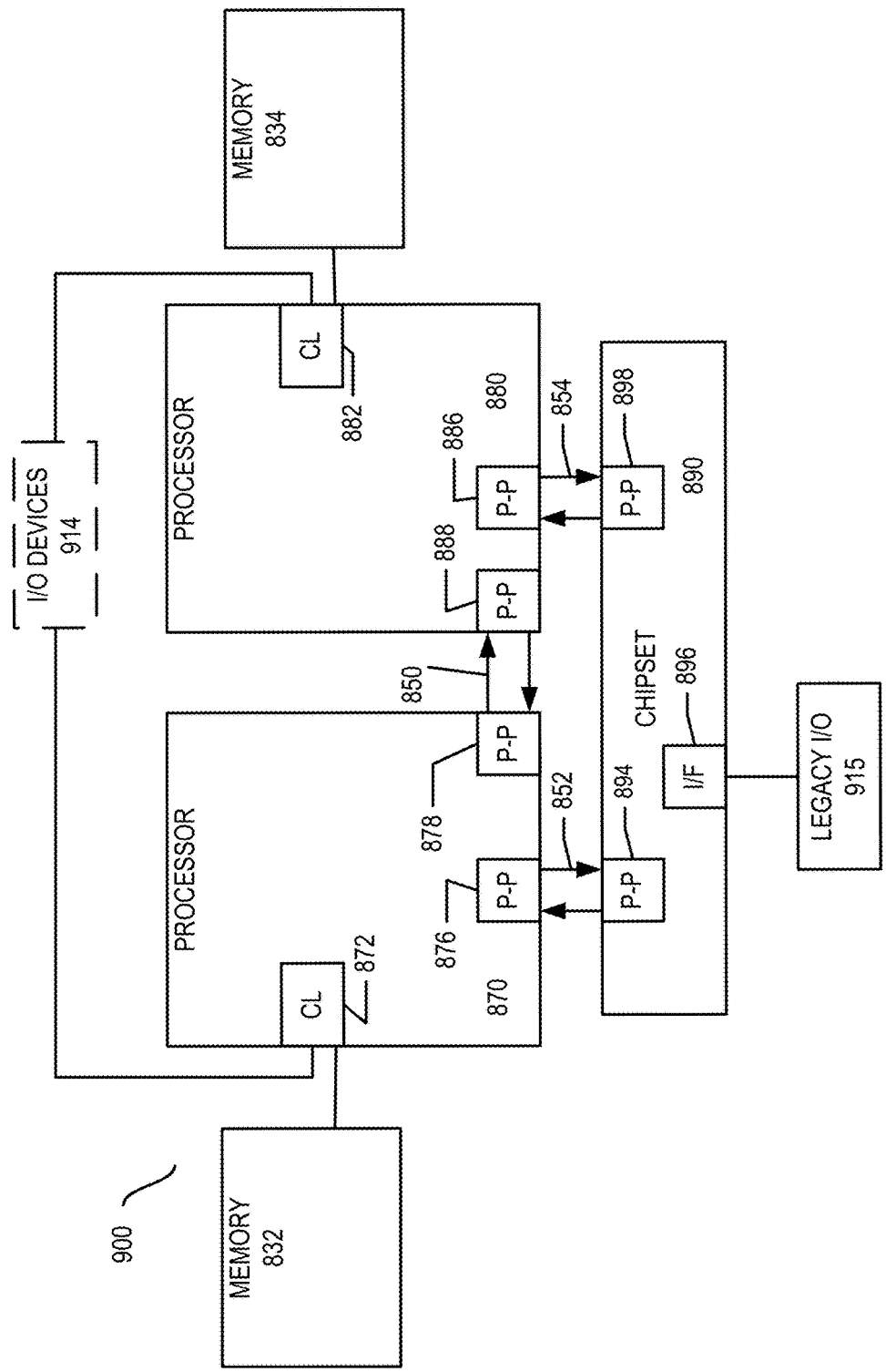
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 872 and 882, respectively. Thus, the CL 872, 882 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
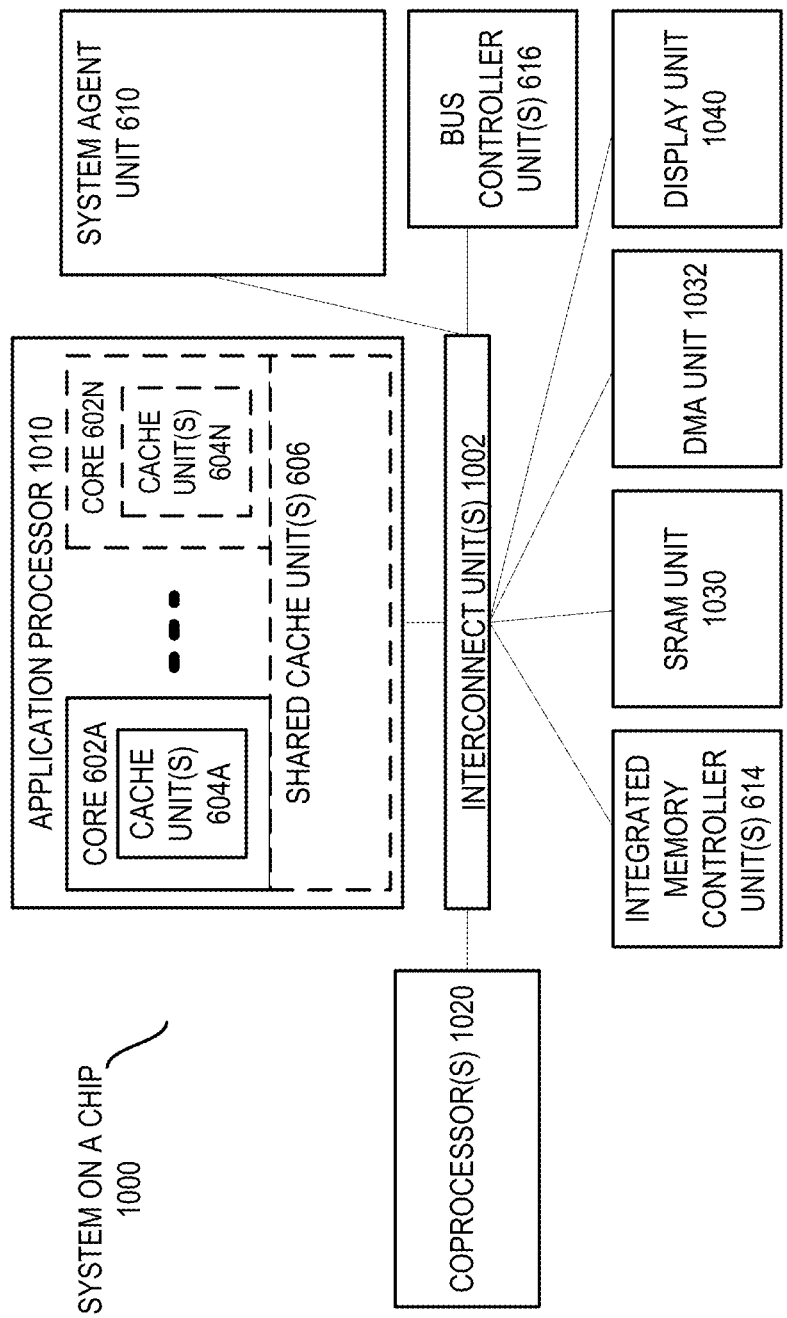
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 202A-N and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
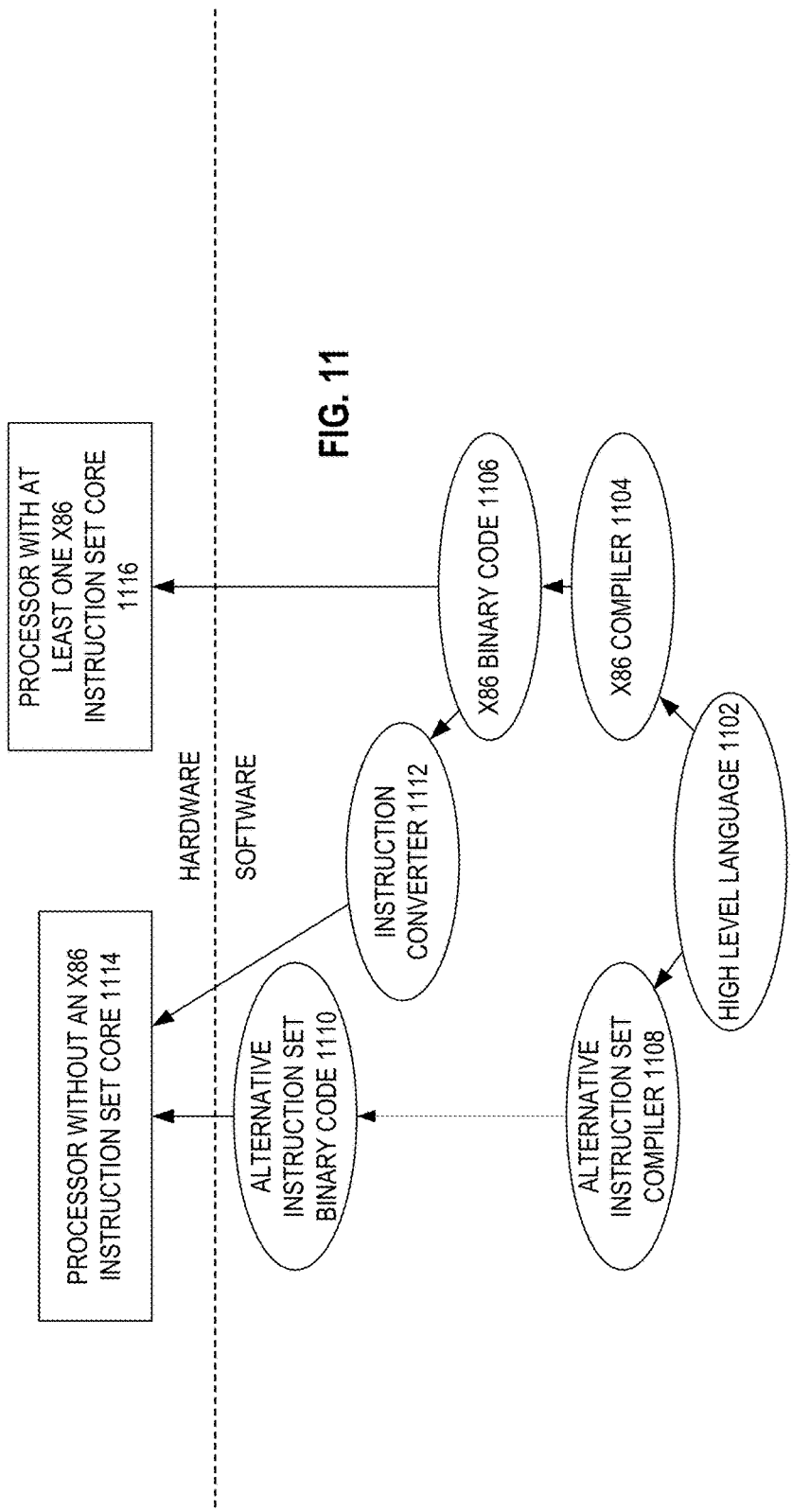
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1104 represents a compiler that is operable to generate x86 binary code 1106 (e.g., object code) that can, with or without additional linkage processing, be executed on the processor with at least one x86 instruction set core 1116. Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

Method and Apparatus for Performing Reduction Operations on a Set of Vector Elements "Sparse updates" are an important algorithmic pattern for which vectorization would be beneficial. Here, a read-modify-write operation may be performed on an indirectly addressed memory location (e.g., load A[B[i]], add something to it, and store the value back in A[B[i]]). Vectorizing this type of operation involves performing a gather-modify-scatter operation. By way of example, such an operation may involve performing 16 indirect loads of the form A[B[i]] for 16 consecutive values of i via a gather operation, performing a single instruction multiple data (SIMD) computation, and scattering the new values back to memory. However, this vectorization assumes that a single gather/scatter instruction will access each memory location no more than once. If, for example, two consecutive values of B[i] are the same, then the read-modify-write for the second one is dependent on the first. As such, doing these simultaneously in a SIMD fashion violates these dependencies and may result in an incorrect result.

One embodiment of the invention utilizes a conflict detection instruction such as VPCONFLICT that compares the elements within a vector register to detect duplicates. In particular, the instruction may test each element of its vector register input for equality with all earlier elements of that input (e.g., all elements closer to the least significant bit (LSB)), and outputs the results of these comparisons as a set of bit vectors. The conflict detection instruction provides a way to determine whether or not an element has a data dependence that involves other elements within the same SIMD register.

Figure 12:
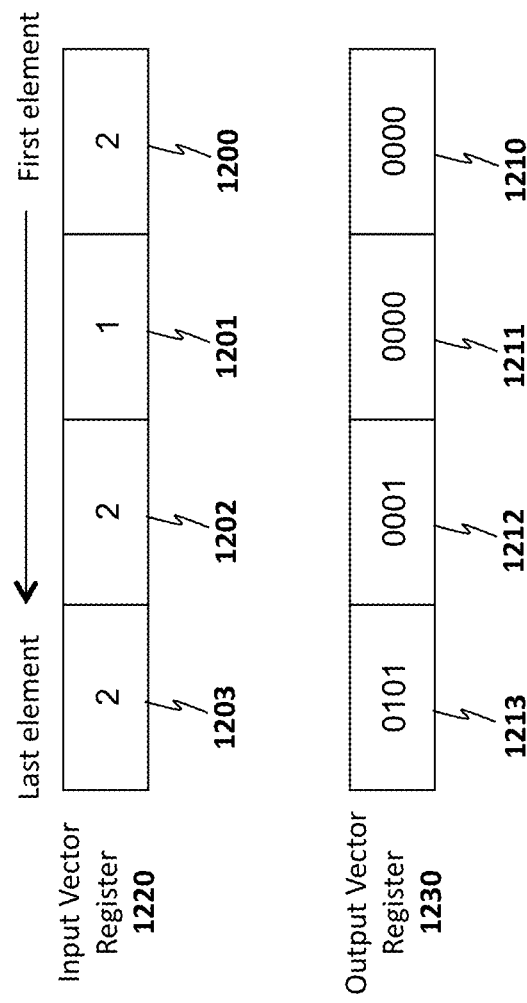
FIG. 12 illustrates how conflict detection operations may be performed in accordance with one embodiment of the invention.

FIG. 12 illustrates an example with an input vector register 1220 comprising a set of data elements 1200-1203 and an output register 1230 to store the results 1210-1213 of the conflict detection instruction. In operation, the conflict detection instruction compares each of the data elements 1200-1203 to the data elements that precede it. The first element 1200 is not compared with another element (because no elements precede it) and the result is stored as 0000 in the first element in the output vector register 1230, indicating no conflict. The second element 1201 is compared with the first element 1200. Because the elements are not equal, the result is also 0000 (no conflicts) stored in the second location 1211 of the output vector register 1211. Because the third element 1202 is equal to the first element 1200, the result of 0001 is stored in the third output location 1212 of the output vector register 1230. In one embodiment, the 0001 is a binary value and the 1 in the first position of the result indicates that the third element 1202 is equal to the first element 1200 of the input vector register 1220. Finally, because the fourth element 1203 is equal to both the first element 1200 and the third element 1202, a value of 0101 is set in the fourth location 1213 of the output vector register 1230 (with the first 1 in the first bit position indicating the equality with the first data element 1200 and the second 1 in the third bit position indicating the equality with the third data element 1202).

The ability to identify duplicate values within separate elements of a SIMD register allows scalar code to be vectorized in cases where possible data dependencies across SIMD register elements might otherwise prevent vectorization. For example, dependencies can be enforced by determining a subset of elements with unique indices, computing those in SIMD fashion, and then looping back to retry the remaining elements, thus serializing the computation on elements with the same index. In the above example, the first two elements would be computed simultaneously, followed by the third element by itself (retrieving the input value from the output value of the first element), and the last element by itself (retrieving the input value from the output value of the third element). This approach is represented in the following example loop which performs an operation ("Compute") on an array of N data elements and is vectorized to operate on SIMD_WIDTH elements per iteration:

```
for (i=0; i<N; i+=SIMD_WIDTH) {
    indices = vload(&B[i]);
    comparisons = vpconflict(indices);
    permute_indices = vsub(all_31s, vplzcnt(comparisons));
    // do gather + compute on all elements, assuming no dependences
    data = Gather_Compute(indices);
    // generate mask with '1' for elements with any dependence
    elements_left_mask = vptestm(comparisons, all_ones);
    // if any dependences, recompute corresponding elements of "data"
    while (elements_left_mask != 0) {
        do_these = Compute_Mask_of_Unique_Remaining_Indices(
            comparisons, elements_left_mask);
        data = vperm(data, permute_indices, do_these);
        data = Compute(data, do_these);
        elements_left_mask ^= do_these;
    }
    scatter(indices, data);
}
```

A discussion of the Compute_Mask_of_Unique_Remaining_Indices function has been omitted for brevity.

While the above code example is vectorized, the vectorized version of the loop can sometimes result in lower performance than its scalar equivalent, making it hard to predict whether vectorization will be beneficial or not. In particular, the performance boost provided by vectorization is dependent on how many elements in the index SIMD register ('indices') have duplicate values. This approach works well when there are a few instances of any given index—i.e., when the common case is to have a few iterations of the while loop. However, when there are many instances of the same index, the execution time may be worse than scalar execution because the maximum number of 'while' loop iterations is equal to the SIMD width.

To address these issues, the embodiments of the invention described below include techniques to perform multiple tree reductions in parallel, one reduction per unique index value, on the elements within a SIMD register. This approach has at most $\log_2$SIMD_WIDTH compute steps. In particular, certain embodiments of the invention are capable of performing an arbitrary number of binary tree reductions in parallel across a set of values having an arbitrary ordering within a SIMD register. The information-rich output of conflict detection instructions such as VPCONFLICT may be used to iteratively identify and combine the partial results from pairs of SIMD elements with the same index. A new instruction, VPOPCNT, may be used for this approach, as it allows each of the elements that share an index to be ordered. One embodiment of the VPOPCNT instruction counts the number of set bits (i.e., 1's) in each SIMD element.

Within a single SIMD register, there may be multiple values that need to be combined via one or more reduction patterns. For example, an application may have a set of values {a0, b0, a1, a2, b1, a3, a4, b2} within a single SIMD register that need to be combined so that all of the 'a' values are summed and all of the 'b' values are summed, yielding just two values {a0+a1+a2+a3+a4, b0+b1+b2}. While there are multiple ways to do this, the most efficient way given a reduction operation with only two inputs (e.g., an add instruction in a processor) is to perform multiple binary tree reductions in parallel across the elements of the SIMD register.

The embodiments of the invention address the problem of performing multiple in-register reductions across the lanes of a vector register without having to either (A) serialize the reduction operations for each of the independent reductions or (B) count the number of instances of each unique index value within an associated "index" vector. This may be accomplished by generating a first output which identifies the independent reductions and generating a second output which may be used to identify left vs. right children in the binary reduction trees, as described in detail below. In one embodiment, the first output is generated using the VPCONFLICT instruction and the second output is generated using the VPOPCNT instruction.

Figure 13:
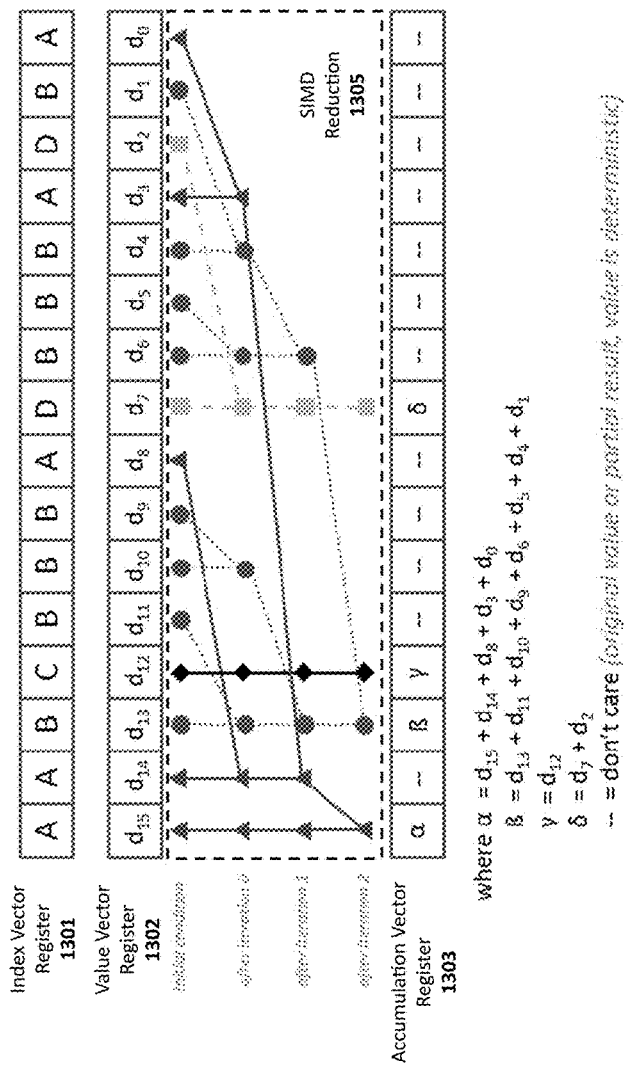
FIG. 13 illustrates one embodiment of the invention for performing reduction operations on data elements within a value vector register.

As shown in FIG. 13, one embodiment of the SIMD tree reduction logic 1305 takes two vector registers as input: a "value" vector register 1302 containing the values to be reduced (e.g. summed) and an "index" vector register 1301 indicating which values (or lanes) in the "value" vector are associated with one another. If two lanes in the "index" vector register 1301 have equal values, then they are involved in the same tree reduction. If two lanes in the "index" vector register 1302 have different values, then they are involved in separate reductions. The output of the SIMD tree reduction logic 1305 is an accumulation vector register 1303 containing the result of each reduction in the left-most lane (i.e. closest to the most significant byte) containing an instance of the index value associated with that reduction.

While the embodiments disclosed herein utilize an arrangement in which the most significant bits/bytes of each register are to the "left" and the least significant bits/bytes are to the "right," the underlying principles of the invention are not limited to such an arrangement. For example, in an alternate embodiment, the least significant bits/bytes are to the "left" and the most significant bits/bytes are to the "right." For this embodiment, any reference to "left" or "leftmost" in the present disclosure may be replaced with "right" or "rightmost" and vice versa.

In the example in FIG. 13, the values A, B, C, and D within the index vector register 1301 represent arbitrary (unique) integer values. FIG. 13 also illustrates how, with each iteration (iterations 0-2 are shown), different sets of the values from the value vector 1302 are summed by the SIMD tree reduction logic to perform the reduction operation. For example, each instance of A in the index vector register 1301 identifies the set of values in the value vector register to be reduced: d15, d14, d8, d3, and d0. After the final iteration, these values have been summed to form a single value, α, which is stored in the leftmost data element position of the accumulation vector 1303 (consistent with the position of the left-most A in the index vector). The value for β is formed in the same manner using values associated with each instance of B from the index vector (d13, d11, d10, d9, d6, d5, d4, and d1) and the final value for β is stored at the third data element position from the left in the accumulation vector register 1303 (consistent with the position of the left-most B in the index vector).

The following pseudocode represents the in-register tree reductions which may be performed by the SIMD tree reduction logic 1305 based on index values:

---

```
accum_vec = value_vec;
// only required if the loop should not clobber value_vec
vc_vec = vpconflict(index_vec);
// detect duplicates that are earlier in index_vec
while (!all_zeros(vc_vec)) {
// enter loop if any duplicate indices haven't been reduced
    pc_vec = vpopcnt(vc_vec);
    // assign elements w/ same index value unique sequence #s
    eo_mask = vptestm(pc_vec, vpbroadcastm(0x1));
    // =1 for odd elements w/ same index (circled values in Figure 15)
    i_vec{eo_mask} = vpsub(vpbroadcast(31), vplzcnt(vc_mask));
    // index of sibling in tree
    tmp_vec = vpermd(accum_vec, i_vec);
    // move right sibling into same lane as left
    accum_vec{eo_mask} = VEC_OP(tmp_vec, accum_vec);
    // apply reduction on siblings, storing result in left sibling
    vc_vec = vpand(vc_vec, vpbroadcastm(eo));
    // clear conflict bits for reduced elements
}
```

---

In operation, the vector register "value_vec" (the value vector register 1302) contains the values to be reduced, and the vector register "index_vec" (the index vector register 1301) contains the indexes or associations of those values. For example, in one embodiment, equal values within "index_vec" means that the corresponding values in "value_vec" belong to the same reduction. The VEC_OP function represents any operation that would normally be used in a reduction, which is typically a commutative and associative mathematical operation such as integer addition. Left-side values with brackets (e.g. "cnt_vec{eo_mask}") represent vector operations performed under mask. For the "i_vec{eo_mask}" operation, any inactive lanes should be zeroed. For the "accum_vec{eo_mask}" operation, any inactive lanes should retain the previous value of "accum_vec."

Once completed, the "accum_vec" vector contains the results of all the reductions that occurred in parallel, one for each unique value contained in "index_vec." The result of each reduction will be in the left-most lane (closest to the MSB) of the "accum_vec" register 1303 that had an index value associated with that reduction in "index_vec" (as illustrated in FIG. 13).

In circumstances where all values in the "index" vector are unique (i.e., a "conflict-free" case) the cost of these techniques is fairly minimal (the cost of VPCONFLICT and the initial "while" loop condition test which will be false, and the loopback branch). In the case where all values in the "index" vector are the same (i.e. "most conflicted" case), these techniques will iterate '$\log_2 N$' times, where N is the vector width. This is in contrast to prior implementations mentioned above which would instead execute N iterations because each reduction is effectively serialized (e.g., accumulating one value/lane at a time in each reduction). In general, the embodiments of the invention execute '$O(\log_2 N)$' iterations to perform an arbitrary number of reductions in parallel across the "value" vector 1302, where N is the number of instances of the value in "index" vector 1301 that has the most instances. For example, in FIG. 13, the value "B" has the most instances in the "index" vector, with a total of N=8 instances (there are 5 instances of A, 1 instance of C, and 2 instances of D). For this example, the techniques described herein would iterate 3 times ($\log_2$ N), while the previous algorithm would iterate 8 times (N).

A specific example will now be described with respect to FIGS. 14 and 15. For clarity, this detailed example execution follows the example shown in FIG. 13. As used herein, the least significant bit (LSB) and least significant lane (LSL) are the right-most values shown (e.g., vector register={lane 15, lane 14, . . . , lane 0}). For mask values, underscores are used to group bits visually, for clarity.

Input values along with the result of the first conflict detection operation (e.g., VPCONFLICT) are as follows, where A, B, C, and D represent unique and arbitrary integer values, and d0 through d15 represent the values involved in the reductions:

index_vec={A, A, B, C, B, B, B, A, D, B, B, B, A, D, B, A}
value_vec={d15, d14, d13, d12, d11, d10, d9, d8, d7, d6, d5, d4, d3, d2, d1, d0}
accum_vec=value_vec; # Only required if should not clobber value_vec register
vc_vec={0x4109, 0x0109, 0x0E72, 0x0000, 0x0672, 0x0272, 0x0072, 0x0009, 0x0004, 0x0032, 0x0012, 0x0002, 0x0001, 0x0000, 0x0000, 0x0000}

Figure 14:
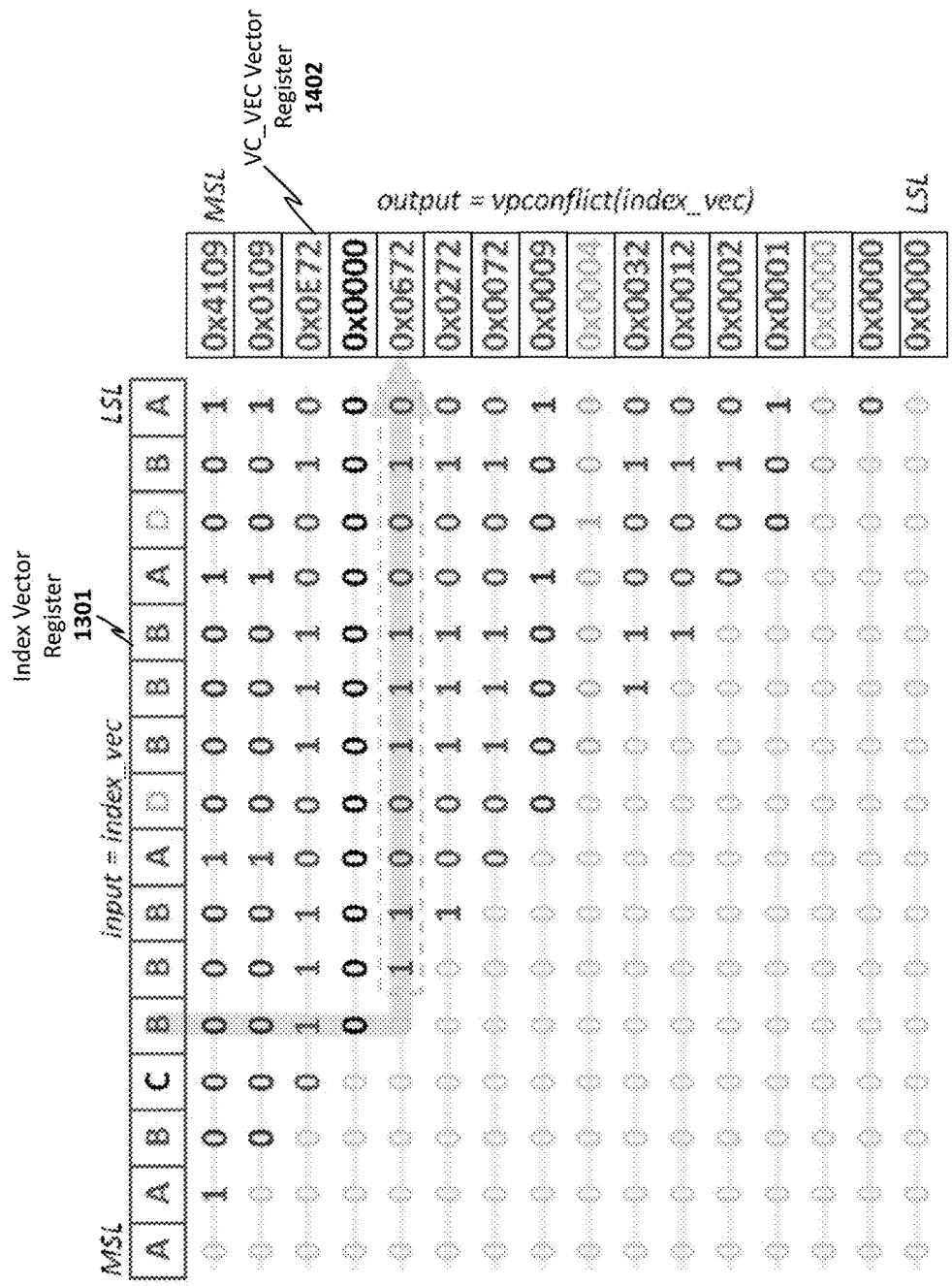
FIG. 14 illustrates additional details of how conflicts are detected using index values and stored within a vector register.

FIG. 14 illustrates the conflict detection operations (e.g., implemented with VPCONFLICT) that create the initial "vc_vec" value within output vector register 1402. In the illustrated embodiment, the output vector register 1402 stores 16 data elements, each associated with one of the index data elements stored within the index data register, with the value of the element representing the earlier conflicts associated with the corresponding lane. As mentioned above, each element in the index vector register 1301 is compared with all of the other elements closer to the least significant lane/bit. Thus, an index data element in position #4 (a B in the example) is compared with data elements in position #3 (A), position #2 (D), position #1 (B), and position #0 (A). If the data element is equal to any of the data elements closer to the least significant lane, then a corresponding bit is set within the output vector register 1402. So, for example, the second B from the left in the index vector register 1301 generates the output 11001110010, with 1 s indicating the positions of the other Bs in the index vector register 1301. This value is then stored in the output vector register 1402 (represented in the example by hexadecimal value 0x0672) at a location corresponding to the location of the B for which the comparisons are performed, as illustrated. Similar operations are performed for each index value stored in the index vector register 1301.

Next, the "while" loop set forth above is iterated as long as there is at least one bit set in the "vc_vec" value in the output vector register 1302. For the sake of the illustrated example, the reduction operation is addition (e.g., VEC_OP=vpadd). Consequently, the results of iteration 0 are as follows:

pc_vec = {4, 3, 7, 0, 6, 5, 4, 2, 1, 3, 2, 1, 1, 0, 0, 0} eo_mask =

0110_0100_1101_1000 # individual bits, underscores used for clarity i_vec = {0, 8, 11, 0, 0, 9, 0, 0, 2, 5, 0, 1, 0, 0, 0, 0} tmp_vec =

{d0, d8, d11, d0, d0, d9, d0, d0, d2, d5, d0, d1, d0, d0, d0, d0} accum_vec = {d15, d14 + d8, d13 + d11, d12, d11, d10 + d9, d9, d8, d7 + d2, d6 + d5, d5, d4 + d1, d3 + d0, d2, d1, d0} vc_vec = {0 × 4008, 0 × 0008, 0 × 0450, 0 × 0000, 0 ×

0450, 0 × 0050, 0 × 0050, 0 × 0008, 0 × 0000, 0 × 0010, 0 ×

0010, 0 × 0000, 0 × 0000, 0 × 0000, 0 × 0000, 0 × 0000}

Figure 15:
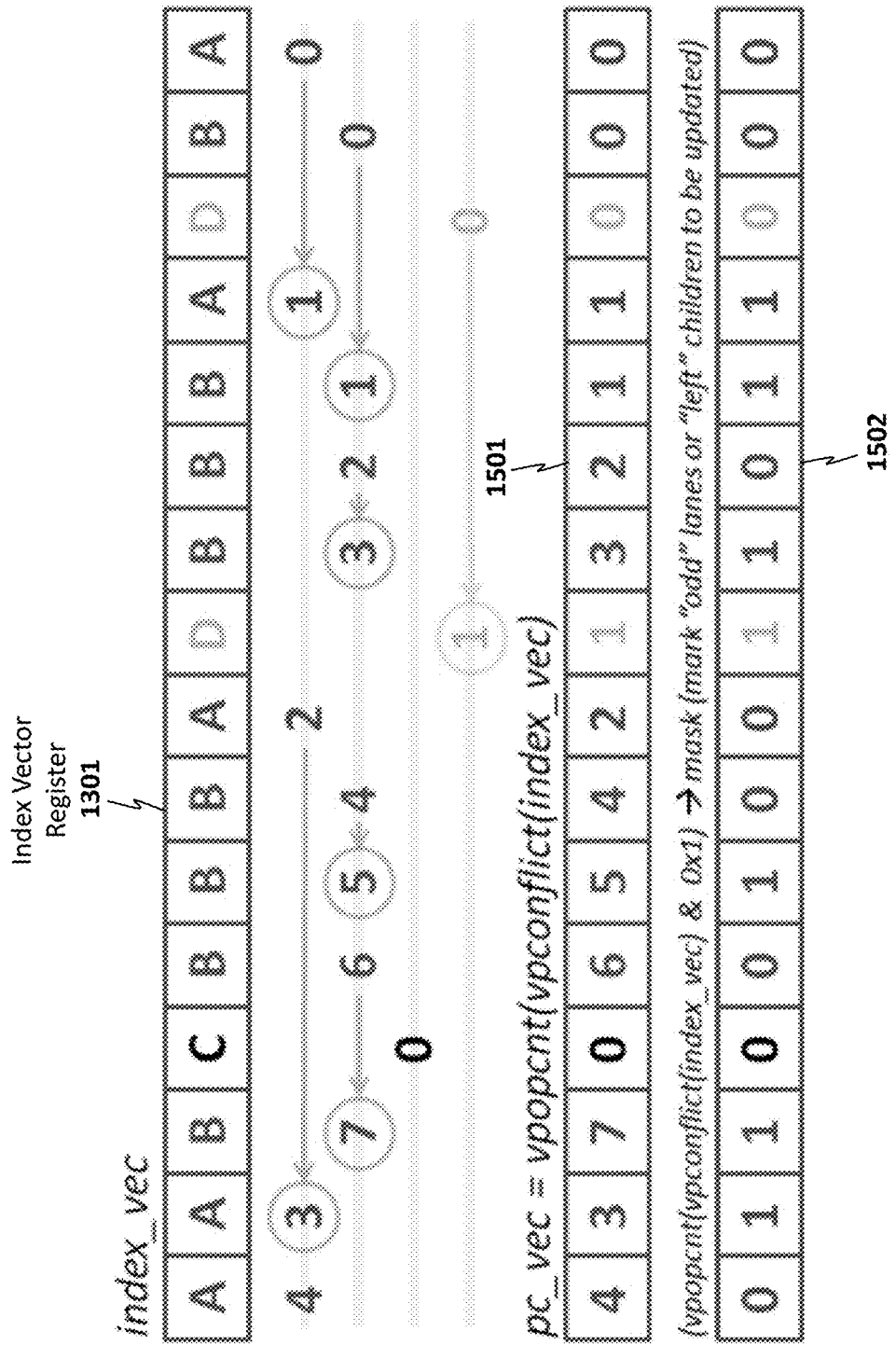
FIG. 15 illustrates additional details related to the performance of reduction operations in accordance with one embodiment of the invention.

FIG. 15 illustrates how the pc_vec values are determined for iteration 0 and stored as data elements within a vector register 1501. In particular, each data element in the pc_vec vector register 1501 corresponds to an index in the index vector register 1301 and has a value equal to the number of instances of the index value which are stored in the index vector register 1301 closer to the least significant lane/bit. For example, the left-most value of 4 in the pc_vec vector register 1501 is associated with the left-most instance of index A in the index vector register 1301 and indicates that there are 4 other instances of index A in the index vector register 1301 (i.e., to the right of the left-most instance of A). Similarly, the value of 7 in the pc_vec vector register 1501 is associated with the instance of index B located in a corresponding position in the index vector register (i.e., 2 positions from the left in the illustrated example). The value of 7 indicates that there are 7 instances of index B stored to the right in the index vector register 1301.

In addition, FIG. 15 illustrates how the bits within the eo_mask register 1502 are updated. In particular, a bit associated with each index value is set to 1 to indicate an odd number of other instances of that index value to the right within the index vector register 1301. Thus, for a given index value, the bits associated with that index value will alternate between 1 and 0 within the eo_mask register 1502.

Following iteration 0, since there are still bits set in the "vc_vec" value in the output vector register 1402 another iteration is performed ("iteration 1"):

pc_vec = {2, 1, 3, 0, 3, 2, 2, 1, 0, 1, 1, 0, 0, 0, 0, 0} eo_mask = 0110_1001_0110_0000 i_vec = {0, 3, 10, 0, 12, 0, 0, 3, 0, 4, 4, 0, 0, 0, 0, 0} tmp_vec = {d0, d3 + d0, d10 + d9, d0, d12, d0, d0, d3 + d0, d0, d4 + d1, d4 + d1, d0, d0, d0, d0, d0} accum_vec = {d15, d14 + d8 + d3 + d0, d13 + d11 + d10 + d9, d12, d12 + d11, d10 + d9, d9, d8 + d3 + d0, d7 + d2, d6 + d5 + d4 + d1, d5 + d4 + d1, d4 + d1, d3 + d0, d2, d1, d0} vc_vec = {0 × 4000, 0 × 0000, 0 × 0040, 0 × 0000, 0 × 0040, 0 × 0040, 0 ×

0040, 0 × 0000, 0 × 0000, 0 × 0000, 0 × 0000, 0 ×

0000, 0 × 0000, 0 × 0000, 0 × 0000, 0 × 0000}

Following iteration 1, since there are still bits set in the "vc_vec" value in the output vector register 1402 another iteration is performed:

pc_vec = {1, 0, 1, 0, 1, 1, 1, 0, 0, 0, 0, 0, 0, 0, 0, 0} eo_mask = 1010_1110_0000_0000 i_vec = {14, 0, 6, 0, 6, 6, 6, 0, 0, 0, 0, 0, 0, 0, 0, 0} tmp_vec = {d14 + d8 + d3 + d0, d0, d6 + d5 + d4 + d1, d0, d6 + d5 + d4 + d1, d6 + d5 + d4 + d1, d6 + d5 + d4 + d1, d0, d0, d0, d0, d0, d0, d0, d0, d0} accum_vec = {d15 + d14 + d8 + d3 + d0, d14 + d8 + d3 + d0, d13 + d11 + d10 + d9 + d6 + d5 + d4 + d1, d12, d12 + d11 + d6 + d5 + d4 + d1, d10 + d9 + d6 + d5 + d4 + d1, d9 + d6 + d5 + d4 + d1, d8 + d3 + d0, d7 + d2, d6 + d5 + d4 + d1, d5 + d4 + d1, d4 + d1, d3 + d0, d2, d1, d0} vc_vec = {0 × 0000, 0 × 0000, 0 × 0000, 0 × 0000, 0 × 0000, 0 ×

0000, 0 × 0000, 0 × 0000, 0 × 0000, 0 ×

0000, 0 × 0000, 0 × 0000, 0 ×

0000, 0 × 0000, 0 × 0000, 0 × 0000}

Since the "vc_vec" in the output vector register 1402 now contains all zeroes, the loop exits. The result of the loop is as follows, with input repeated for reference:

index_vec = {A, A, B, C, B, B, B, A, D, B, B, B, A, D, B, A} value_vec =

{d15, d14, d13, d12, d11, d10, d9, d8, d7, d6, d5, d4, d3, d2, d1, d0} accum_vec = {d15 + d14 + d8 + d3 + d0, d14 + d8 + d3 + d0, d13 + d11 + d10 + d9 + d6 + d5 + d4 + d1, d12, d12 + d11 + d6 + d5 + d4 + d1, d10 + d9 + d6 + d5 + d4 + d1, d9 + d6 + d5 + d4 + d1, d8 + d3 + d0, d7 + d2, d6 + d5 + d4 + d1, d5 + d4 + d1, d4 + d1, d3 + d0, d2, d1, d0}

Values are bolded in index_vec to highlight which lanes represent the final reduction results and values are bolded in accum_vec above to match the bolding of index_vec. Notice that the result of each reduction is in the left-most lane with an index value associated with that reduction. In this example, the left-most index value "A" is associated with the result "d15+d14+d8+d3+d0" (lane 15) the left-most index value "B" is associated with the result "d13+d11+d10+d9+d6+d5+d4+d1" (lane 13) the left-most index value "C" is associated with the result "d12" (lane 12), and the leftmost index value "D" is associated with the result "d7+d2" (lane 7). This matches the final state presented in FIG. 13, marked as "after iteration 2."

Having the result in the left-most lane (or most significant lane (MSL)) is advantageous on some architectures (e.g., such as IA) because of the scatter instruction definition. In cases where multiple elements in the scatter have the same index (i.e. write to the same memory location), the left most lane's (MSL) value overwrites any others. While the leftmost is preferred for this specific embodiment, the underlying principles of the invention are not limited to using the left-most lane for the result. The result for a given index value may be stored in either the left-most or right-most lane associated with that index value since scatter instructions are often defined to give deterministic results by preferring either the left-most or right-most value associated with that index value when duplicates occur. In the example code presented above, the left-most lane associated with a given index value is preferred.

Figure 16:
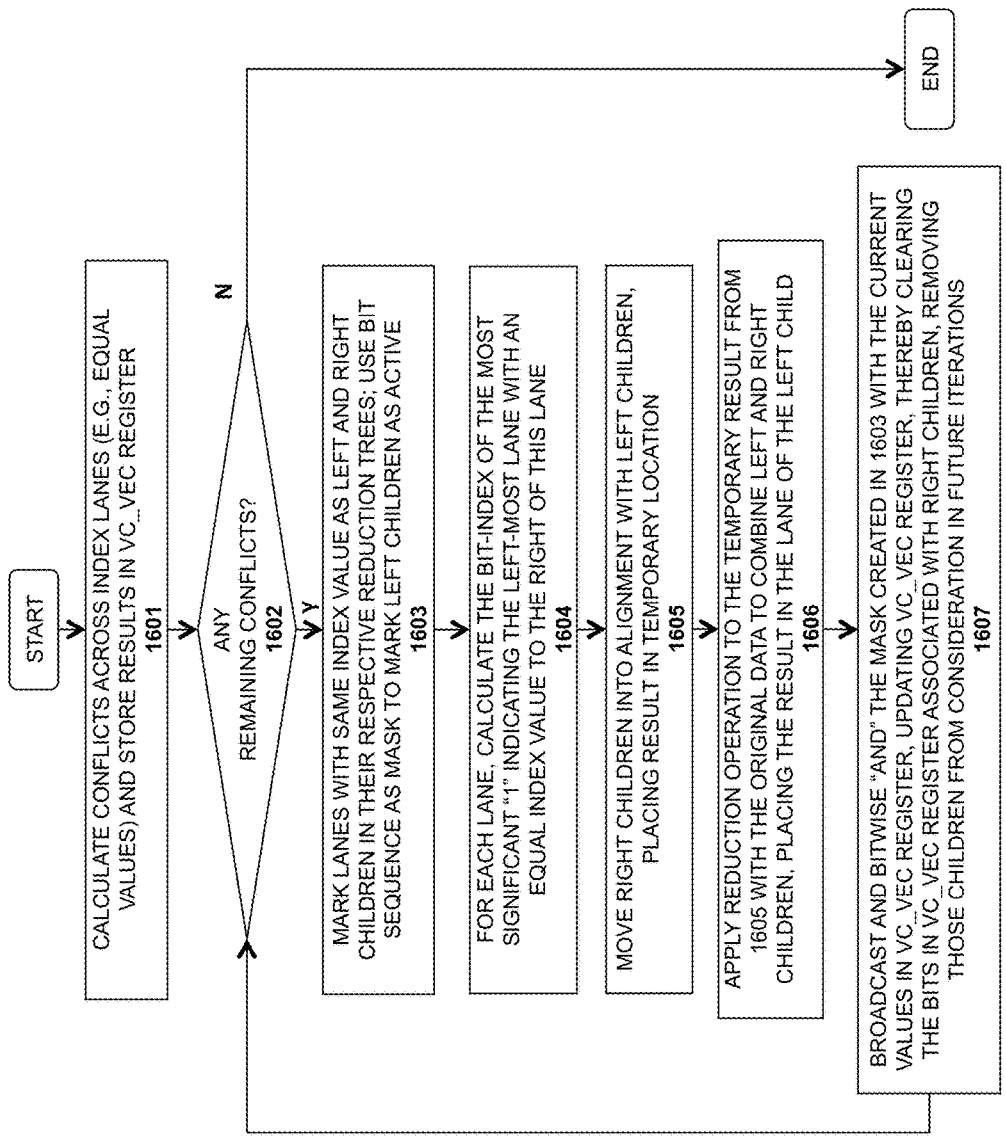
FIG. 16 illustrates a method in accordance with one embodiment of the invention.

A method in accordance with one embodiment of the invention is illustrated in FIG. 16. The method may be implemented within the context of the architectures described above, but is not limited to any specific system or processor architecture.

At 1601, conflicts are detected across index lanes (e.g., equal index values further to the least significant bit/lane) and the results are stored in a VC_VEC register. For example, in one embodiment, the conflicts are detected using a conflict detection instruction such as VPCONFLICT (see, e.g., FIG. 12 and associated text).

A determination is made at 1602 as to whether any conflicts exist. This may be determined, for example, by checking whether VC_VEC has any bits currently set. If not, then the process terminates. If so, then at 1603, lanes with the same index value are marked as left and right children in their respective reduction trees. In one embodiment, this is accomplished with VPOPCNT(VC_VEC) & 0x1 (as described above). In one embodiment, this bit sequence is used as a mask (LSB per lane) which marks the left children as active (e.g., left children have an odd number of conflicts to the right while right children have an even number).

At 1604, for each lane, the bit index is calculated for the most significant 1 indicating the leftmost lane (MSL) with an equal index value to the right of this lane (LSL). At 1605, the right children are moved into alignment with left children, placing the result in a temporary location. In one embodiment, this is accomplished using a vector permute/shuffle instruction.

At 1606, the reduction operation is applied to the temporary result from 1605 with the original data to combine left and right children, placing the result in the lane of the left child. At 1607 the mask created in 1603 is broadcast and bitwise ANDed with the current values in the VC-VEC register, updating the VC-VEC register and thereby clearing the bits in the VC_VEC register associated with the right children (i.e., removing those children from consideration in future iterations). The process then returns to 1602 which determines whether any conflicts remain (e.g., checking whether VC_VEC has any bits set to 1). If not, the process terminates; if so, another iteration through 1603-1607 is performed.

One application of the above techniques is in a "histogram" style operation, one example of which is shown below. Histogram operations are common in various applications, including image processing.

```
// Simple histogram loop
for (int i = 0; i < N; i++) {
    a[b[i]] += 1 ;
}
```

In a loop such as the "histogram" loop above, a complicating factor preventing naive vectorization of this loop is that the values of "b[j]" and "b[k]" may be equal, causing a race condition on the same element of "a" within a single simple vectorized loop iteration. This is referred to as a "conflict." Using the above techniques removes any conflicts by first combining (reducing) any conflicting values into a single value per unique index value.

In the case of the simple histogram above, the "index" vector would be vector-width "b[i]" values and the "value" vector would have a value of "1" in every lane. If the right-hand side of the "+=" operation were the result of a calculation, rather than just a constant of "1," then the "value" vector would hold the result of that vectorized calculation. Our reduction loop could then be used in conjunction with gather and scatter instructions to vectorize the above histogram loop.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a value vector register to store a plurality of data element values to be reduced, wherein each of the data element values within the value vector register is associated with a single instruction multiple data (SIMD) lane in the processor;
an index vector register to store a plurality of index values indicating which values in the value vector register are associated with one another;
SIMD reduction logic to perform reduction operations on the data element values within the value vector register by combining data element values from the value vector register which are associated with one another as indicated by the index values in the index vector register, wherein performing the reduction operations further comprise:
detecting conflicts across each of the lanes to generate conflict results and storing the conflict results in a conflict destination register, and
marking each lane with the same index value as left and right children in their respective reduction trees to generate a bit sequence; and
an accumulation vector register to store results of the reduction operations generated by the SIMD reduction logic.

2. The processor as in claim 1 wherein to perform the reduction operations the SIMD reduction logic is to determine groups of data element values which have the same index value and to combine the data elements having the same index values to generate a plurality of results, each of the plurality of the results comprising an arithmetic combination of a group of data element values sharing the same index value.

3. The processor as in claim 2 wherein the SIMD reduction logic is to store each result within a specified data element location of the accumulation vector register.

4. The processor as in claim 2 wherein the SIMD reduction logic is to determine groups of data element values which have the same index value and to combine the data elements by adding the data elements having the same index values to generate a plurality of results, each result of the plurality comprising a sum of a group of data element values sharing the same index value.

5. The processor as in claim 3 wherein the SIMD reduction logic is to perform the reduction operations by performing a plurality of combination iterations on element values sharing the same index value, each of the combination iterations combining pairs of data element values until a final result is reached in a final iteration.

6. The processor as in claim 3 wherein each specified data element location in the accumulation vector register comprises a location corresponding to a location of an associated index value having a most significant location relative to others of the same index value in the index vector register or a location corresponding to a location of an associated index value having a least significant location relative to others of the same index value in the index vector register.

7. The processor as in claim 1 wherein performing the reduction operations further comprises:
using the bit sequence as a mask which marks the left children as active or which marks the right children as active.

8. The processor as in claim 7 wherein the reduction operations further comprise, for each lane, calculating a bit-index of a most significant 1 indicating a leftmost lane with an equal index value to the right if the mask marks the left children as active or indicating a rightmost lane with an equal index value to the left if the mask marks the right children as active.

9. The processor as in claim 8 wherein the reduction operations further comprise moving right children into alignment with left children if the mask marks the left children as active or moving left children into alignment with right children if the mask marks the right children as active to generate a temporary result and placing the temporary result in a temporary location.

10. The processor as in claim 9 further comprising applying a reduction operation to the temporary result with original data to combine left and right children to generate a new result, and placing the new result in the lane associated with the left child if the mask marks the left children as active or placing the new result in the lane associated with the right child if the mask marks the right children as active.

11. The processor as in claim 9 wherein performing the reduction operations further comprises:
performing a bitwise AND operation of the mask and the conflict results, thereby clearing bits in the conflicts destination register associated with one or more right children and removing those right children from consideration in future iterations if the mask marks the left children as active or performing a bitwise AND operation of the mask and the conflict results, thereby clearing bits in the conflicts destination register associated with one or more left children and removing those left children from consideration in future iterations if the mask marks the right children as active.

12. A method comprising:
storing a plurality of data element values to be reduced in a value vector register, wherein each of the data element values within the value vector register is associated with a single instruction multiple data (SIMD) lane in a processor;
storing a plurality of index values indicating which values in the value vector register are associated with one another in an index vector register;

performing reduction operations on the data element values within the value vector register by combining data element values from the value vector register which are associated with one another as indicated by the index values in the index vector register, wherein performing the deduction operations further comprises:
   detecting conflicts across each of the lanes to generate conflict results and storing the conflict results in a conflict destination register, and
   marking each lane with the same index value as left and right children in their respective reduction trees to generate a bit sequence; and
storing results of the reduction operations in an accumulation vector register.

13. The method as in claim 12 wherein to perform the reduction operations, determining groups of data element values which have the same index value and to combine the data elements having the same index values to generate a plurality of results, each of the plurality of the results comprising an arithmetic combination of a group of data element values sharing the same index value.

14. The method as in claim 13 further comprising storing each result within a specified data element location of the accumulation vector register.

15. The method as in claim 13 further comprising determining groups of data element values which have the same index value and to combine the data elements by adding the data elements having the same index values to generate a plurality of results, each result of the plurality comprising a sum of a group of data element values sharing the same index value.

16. The method as in claim 14 further comprising performing the reduction operations by performing a plurality of combination iterations on element values sharing the same index value, each of the combination iterations combining pairs of data element values until a final result is reached in a final iteration.

17. The method as in claim 14 wherein each specified data element location in the accumulation vector register comprises a location corresponding to a location of an associated index value having a most significant location relative to others of the same index value in the index vector register or a location corresponding to a location of an associated index value having a least significant location relative to others of the same index value in the index vector register.

18. The method as in claim 12 wherein performing the reduction operations further comprises:
   using the bit sequence as a mask which marks the left children as active or which marks the right children as active.

19. The method as in claim 18 wherein the reduction operations further comprise, for each lane, calculating a bit-index of a most significant 1 indicating a leftmost lane with an equal index value to the right if the mask marks the left children as active or indicating a rightmost lane with an equal index value to the left if the mask marks the right children as active.

20. The method as in claim 19 wherein the reduction operations further comprise moving right children into alignment with left children if the mask marks the left children as active or moving left children into alignment with right children if the mask marks the right children as active to generate a temporary result and placing the temporary result in a temporary location.

21. The method as in claim 20 further comprising applying a reduction operation to the temporary result with original data to combine left and right children to generate a new result, and placing the new result in the lane associated with the left child if the mask marks the left children as active or placing the new result in the lane associated with the right child if the mask marks the right children as active.

22. The method as in claim 20 wherein performing the reduction operations further comprises:
   performing a bitwise AND operation of the mask and the conflict results, thereby clearing bits in the conflicts destination register associated with one or more right children and removing those right children from consideration in future iterations if the mask marks the left children as active or performing a bitwise AND operation of the mask and the conflict results, thereby clearing bits in the conflicts destination register associated with one or more left children and removing those left children from consideration in future iterations if the mask marks the right children as active.

* * * * *